Patented Mar. 15, 1938

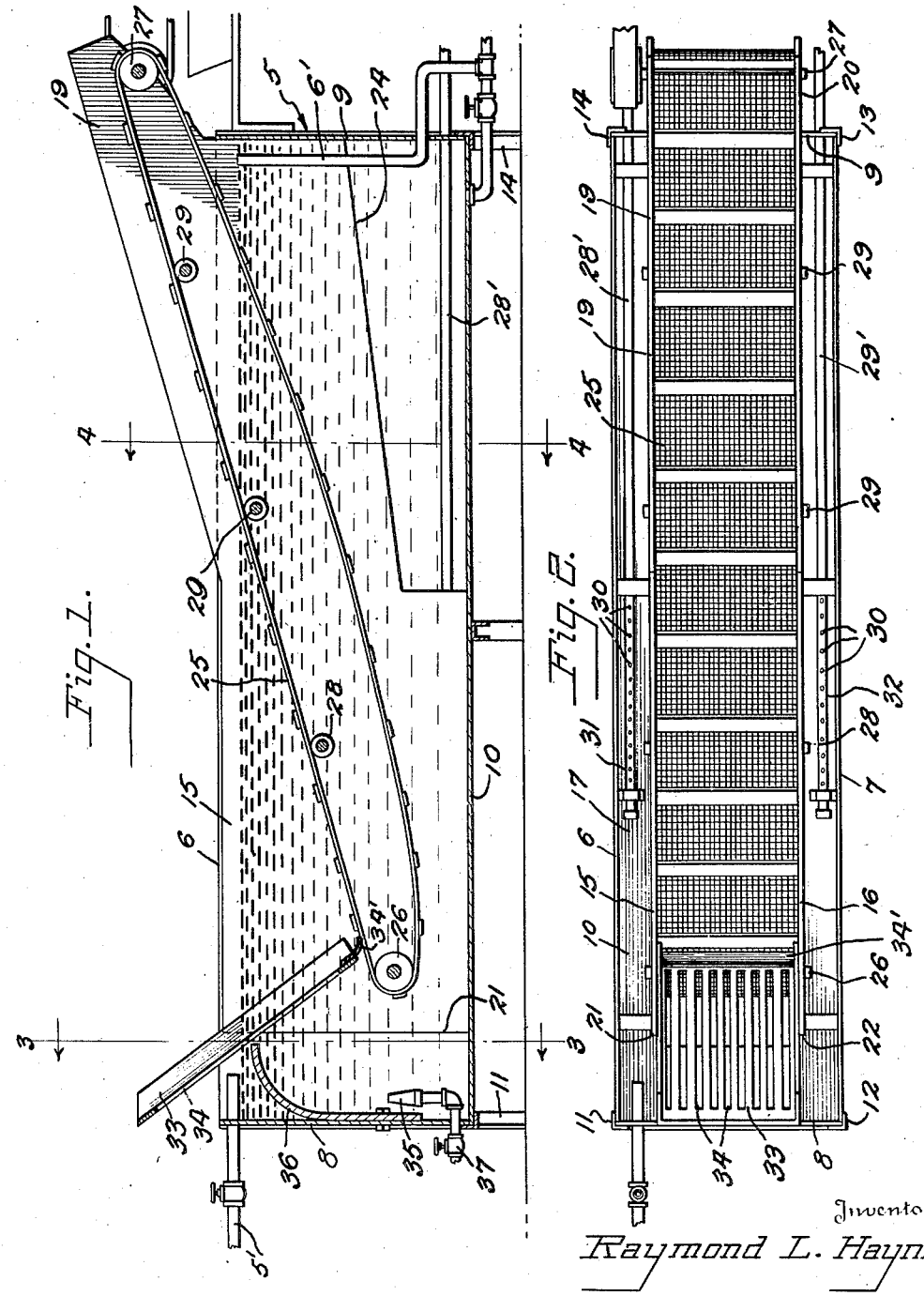

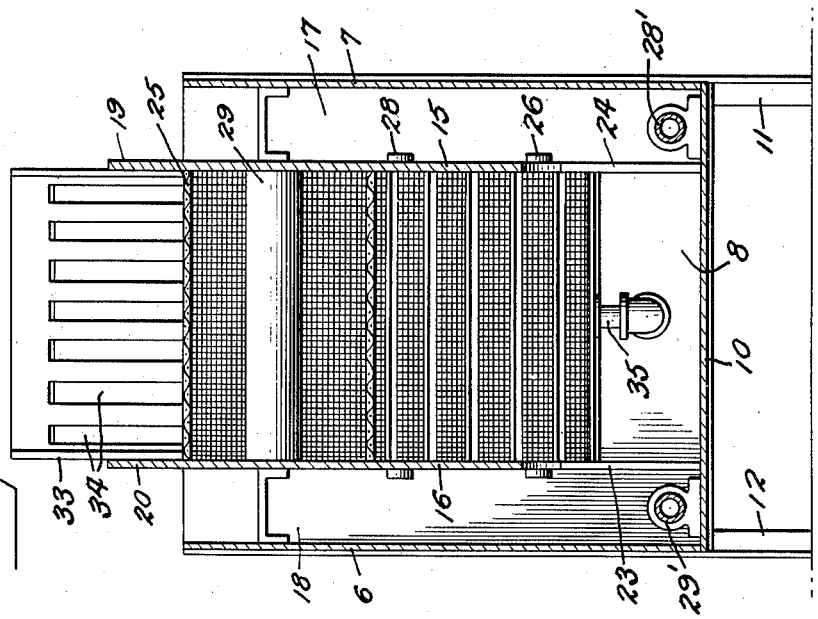
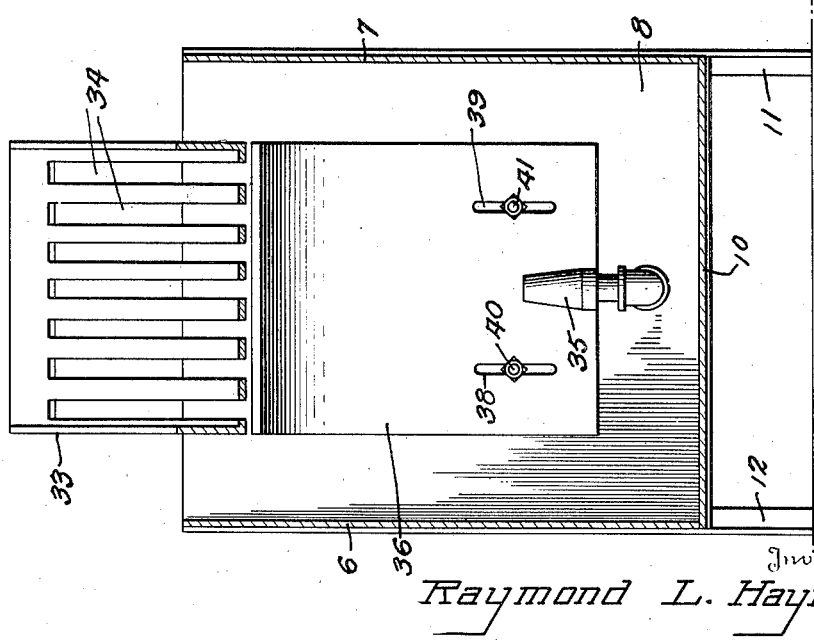

2,111,285

UNITED STATES PATENT OFFICE 2,111,285

TOMATO SCALDER

Raymond L. Haynie, Reedville, Va.

Application July 21, 1937, Serial No. 154,925

4 Claims. (Cl. 146—194)

This invention relates generally to improvements in scalding apparatus; and, more particularly to apparatus of this character designed for use in canneries for scalding tomatoes, or the like, to facilitate the peeling thereof.

The object of the invention is to provide a novel and improved apparatus of this general character, wherein the tomatoes, or the like, to be scalded are submerged within a liquid of high temperature, and in which the tomatoes are automatically retained for periods of time varying with the degree of ripeness of the tomatoes.

Other objects of the invention will become apparent as the detailed description thereof proceeds.

In the drawings:

Figure 1 is a central vertical section taken lengthwise of the apparatus;

Figure 2 is a top plan of the apparatus shown in Figure 1;

Figure 3 is a vertical transverse section taken on the line 3—3 of Figure 1; and Figure 4 is a vertical transverse section taken on the line 4—4 of Figure 1.

As shown in the accompanying drawings, the scalding tank, designated generally by the reference numeral 5, comprises side walls 6 and 7, end walls 8 and 9, and a bottom 10. The tank is suitably supported by angle iron standards 11, 12, 13 and 14, suitably secured to and protecting the corners of the tank 5. Partitions 15 and 16 extend lengthwise throughout the greater part of the tank 5 parallel to the side walls 6 and 7; and are spaced apart from said walls to form chambers 17 and 18, respectively.

The partitions 15 and 16 extend upwardly beyond the upper edges of the side walls 6 and 7, and end wall 9, to form the projecting members 19 and 20; and terminate at their other ends on the vertical edges 21 and 22, a short distance from the end wall 8. The ends of the partitions 15 and 16, below members 19 and 20, contact with the end wall 9, and have their lower portions adjacent the end wall 9, cut away to form recesses 23 and 24.

An endless screen conveyor 25 is mounted by the rollers 26 and 27, suitably journaled parallel to each other in suitable bearings formed in the partitions 15 and 16. Idler rolls 28 and 29, also journaled in suitable bearings in the side walls 15 and 16, support the conveyor in the space between the rollers 26 and 27. Any suitable means may be applied to the roller 27 to effect rotation thereof and cause the conveyor 25 to travel in the usual manner.

The tank 5 is a scalding tank designed to be connected to any suitable source of supply by a valve controlled supply pipe 5', to hold water therein at substantially constant level determined by any suitable overflow outlet 6'. This water may be heated by steam conducted through pipes 28' and 29' connected to a source of supply of steam, which is forced through apertures 30 formed in the parts 31 and 32 arranged in the chambers 17 and 18, between the vertical ends 21 and 22 and recesses 23 and 24. This arrangement prevents the steam emerging under pressure from the apertures 30 setting up an undesirable turbulence of the scalding water in the tank 5, between the partitions 15 and 16.

A chute 33 secured by its opposite sides to the partitions 15 and 16, is arranged so that its lower edge lies closely adjacent to the upper branch of the conveyor 25. This chute is provided with a series of longitudinal slots 34 to form a grid, which directs tomatoes to be scalded toward the upper branch of the conveyor, and at the same time permits the flow of scalding water therethrough caused by the action of a valve controlled steam jet 35, which is located so as to direct steam against a curved plate 36, adjustably secured at its lower end to the end wall 8.

The plate 36 is curved upwardly and inwardly, so that the upper curved part thereof is substantially tangential to the plane defined by the level surface of the scalding water in the tank 5. The object of this construction is to set up a steady flowing current of scalding water near the level surface thereof. The rate of flow may be minutely controlled by means of the valve 37, which is arranged in the piping connecting the steam jet 35 to a suitable source of steam supply. The plate 36 is provided with a pair of slots 38 and 39 adapted to receive slidably the shanks 40 and 41 of bolts which extend through suitable apertures in the end wall 8, and which are provided with nuts for the purpose of clamping the plate 36 in any desired position of vertical adjustment on the end wall 8.

It will be apparent from Figure 1 of the drawings that the conveyor 25 is inclined upwardly within the tank from the lower end of the chute 33. When a batch of tomatoes to be scalded is dumped into the chute, the ripe tomatoes, being heavier, drop at once onto the conveyor and are removed thereby at a speed depending upon the linear rate of movement of the conveyor. The unripe, or partly ripened tomatoes, float at various levels in the scalding water, and move horizontally toward the outlet end of the conveyor, at speeds determined by the rate of current circulation set up by the steam jet 35. The rate of current flow can be regulated by the valve 37, so as to retain the less ripened tomatoes in the scalding water for any desired period of time, as compared with the rate of removal of the ripe vegetables by the conveyor 25.

From the foregoing description, it is throught to be obvious that a scalding apparatus constructed in accordance with my invention is particularly well adapted for use by reason of the convenience and facility with which it may be assembled and operated and it will also be obvious that my invention is susceptible of change and modification without departing from the principles and spirit thereof and for this reason I do not wish to be understood as limiting myself to the precise arrangement and formation of the several parts herein shown in carrying out my invention in practice except as hereinafter claimed.

What I claim is:

1. A tank having scalding liquid maintained at a substantially constant level therein, an endless screen conveyor, means for supporting said conveyor with one end adjacent the bottom and one end wall of said tank and with the other end above the upper edge of the other end wall of said tank, a slotted chute supported within said tank and having its lower end adjacent the first named end of said conveyor, a valve controlled inlet connected to fluid under pressure and extending through the lower part of the first named end wall, a nozzle connected to said inlet and directly upwardly toward said chute to cause circulation of the water in said tank through the slots of said chute toward and through the inclined screen conveyor, and a curved plate mounted on the first named end wall directly above said nozzle and with its curved upper end below and substantially tangential to the horizontal surface of the liquid within the tank.

2. A tank having scalding liquid maintained at a substantially constant level therein, an endless screen conveyor, means for supporting said conveyor with one end adjacent the bottom and one end wall of said tank and with the other end above the upper edge of the other end wall of said tank, a slotted chute supported within said tank and having its lower end adjacent the first named end of said conveyor, a valve controlled inlet connected to fluid under pressure and extending through the lower part of the first named end wall, a nozzle connected to said inlet and directed upwardly toward said chute to cause circulation of the water in said tank through the slots of said chute toward and through the inclined screen conveyor, and a curved plate adjustably mounted on the first named end walls directly above said nozzle and having its curved upper end below and substantially tangential to the horizontal surface of the liquid within the tank, and means for clamping said curved plate in adjusted position on the end wall supporting it.

3. A tank having scalding liquid maintained at a substantially constant level therein, an endless screen conveyor, a pair of parallel partitions extending lengthwise in said tank from one end wall thereof and terminating short of the other end wall, each of said partitions having a part projecting above and outwardly from the upper edge of the first named end wall, means for supporting said conveyor between said partitions with the upper branch thereof extending in a plane passing at an angle through the level surface of said liquid, said partition being provided with recesses adjacent the first named end wall and bottom of the tank to permit circulation of the liquid lengthwise of the tank, a valve controlled inlet extending through the second named end wall and connected to a source of fluid under pressure, a nozzle extending upwardly, a slotted inlet feed chute supported by said partition with its lower end adjacent the lower end of the conveyor, a deflector plate adjustably mounted on the end wall above said nozzle and having its upper end curved to direct the fluid under pressure from said nozzle substantially parallel to the level surface of said liquid to cause the liquid to circulate in the tank through slots of said chute and toward and through the screen conveyor.

4. A tank having scalding liquid maintained at a substantially constant level therein, an endless screen conveyor, a pair of parallel partitions extending lengthwise in said tank from one end wall thereof and terminating short of the other end wall, each of said partitions having a part projecting above and outwardly from the upper edge of the first named end wall, means for supporting said conveyor between said partitions with the upper branch thereof extending in a plane passing at an angle through the level surface of said liquid, said partition being provided with recess adjacent the first named end wall and bottom of the tank, to permit circulation of the liquid lengthwise of the tank, a valve controlled inlet extending through the second named end wall and connected to a source of fluid under pressure, a nozzle extending upwardly, a slotted inlet feed chute supported by said partition with its lower end adjacent the lower end of the conveyor, a deflector plate adjustably mounted on the end wall above said nozzle and having its upper end curved to direct the fluid under pressure from said nozzle substantially parallel to the level surface of said liquid to cause the liquid to circulate in the tank through slots of said chute and toward and through the screen conveyor, and means in the chambers formed by said partitions and the side walls of the tank for heating the scalding liquid.

RAYMOND L. HAYNIE.